United States Patent [19]

Cognet et al.

[11] Patent Number: 4,567,020

[45] Date of Patent: Jan. 28, 1986

[54] APPARATUS FOR LIQUID-LIQUID EXTRACTION USING A MIXING/SETTLING PROCESS

[75] Inventors: Louis Cognet, Le Vesinet; Christian Argoud, Vaulx en Velin; François Matray, Heyrieux; Joël Mallevialle, Carrieres sur Seine, all of France

[73] Assignee: Societe Lyonnaise des Eaux et de l'enclairage, Paris, France

[21] Appl. No.: 604,499

[22] Filed: Apr. 27, 1984

[30] Foreign Application Priority Data

May 2, 1983 [FR] France ................................ 83 07253

[51] Int. Cl.[4] .............................................. B01L 11/00
[52] U.S. Cl. ..................................... 422/101; 422/106; 422/229; 422/231; 422/235; 422/259; 422/260; 202/169
[58] Field of Search ............... 422/106, 224, 225, 229, 422/231, 227, 258, 259, 260, 101, 234, 235; 423/658.5, 281; 202/83, 168, 169, 170, 180, 175, 228, 265, 269

[56] References Cited

U.S. PATENT DOCUMENTS

| | | | |
|---|---|---|---|
| 2,540,706 | 2/1951 | Beck et al. | 422/225 |
| 2,660,518 | 11/1953 | White | 422/258 |
| 2,729,549 | 1/1956 | Reman et al. | |
| 2,988,429 | 6/1961 | Cooley . | |
| 3,094,468 | 6/1963 | Topham | 422/106 |
| 3,536,454 | 10/1970 | Vuillemey | 422/260 |
| 3,869,255 | 3/1975 | De Witt et al. | 422/106 |
| 4,160,647 | 7/1979 | Sendov et al. | 422/106 |
| 4,337,121 | 6/1982 | English . | |
| 4,375,387 | 3/1983 | de Filippi et al. | 422/260 |
| 4,470,879 | 9/1984 | Hutsun, Jr. | 203/DIG. 19 |
| 4,483,826 | 11/1984 | Lowthan | 422/235 |

FOREIGN PATENT DOCUMENTS

| | | |
|---|---|---|
| 403252 | 9/1924 | Fed. Rep. of Germany . |
| 1794283 | 3/1972 | Fed. Rep. of Germany . |
| 1443985 | 5/1966 | France . |
| 2206109 | 6/1974 | France . |

OTHER PUBLICATIONS

Analytical Chemistry, vol. 49, pp. 231-237, Jan. 1977, C. Wu and I. H. Suffet.
Analytical Chemistry, vol. 54, pp. 1913-1914, 1982, T. L. Peters.
Analytical Chemistry, vol. 53, pp. 1469-1472, 1981, Burkhard Stachel, Klaus Baetjer, Mehmet Cetinkaya, Jeurgen Dueszeln, Uwe Lahl, Klaus Lierse and Wolfram Thiemann.
Pollution des Eaux par les Pesticides: I, Appareil d'Extraction en Continu pour la Recherche et le Dosage des Pesticides dans les Eaux, A. Lerenard and R. Simon.

*Primary Examiner*—Barry S. Richman
*Assistant Examiner*—Titus B. Ledbetter, Jr.
*Attorney, Agent, or Firm*—Wenderoth, Lind & Ponack

[57] ABSTRACT

An apparatus for carrying out a liquid-liquid extraction process by co-current contact between an extraction liquid and a liquid from which impurities are to be extracted includes a mixing compartment in the form of a vertical column having an open lower end and equipped in its interior and substantially throughout its length with a rotary element having surfaces extending perpendicularly or obliquely to the axis of the element. The open lower end of the column extends into a settling compartment in the form of a leak-proof container provided with means for determining the level of the extraction liquid in the container. The extraction liquid is recycled from the container by being converted to a gas and then reintroduced into the column. Compressed air is controlled electronically to supply make-up extraction liquid and any necessary reagents into the settling container to ensure that the level of the extraction liquid is maintained constant.

9 Claims, 4 Drawing Figures

APPARATUS FOR LIQUID-LIQUID EXTRACTION USING A MIXING/SETTLING PROCESS

BACKGROUND OF THE INVENTION

The present invention relates to an apparatus for achieving liquid-liquid extraction of the mixing/settling type used to prepare samples intended for checking the quality of any type of water, e.g., sea water, ground water, surface water and, more particularly, water treated in a water treatment plant.

Checking the water quality requires analysis made continuously on samples transmitted to a laboratory from their sampling site. To carry out these analysis, samples are taken of the constituents to be metered, such as organic compounds (e.g. pesticides) polycyclic or aromatic hydrocarbons, etc., so as to concentrate them to facilitate further analysis.

The extraction of the organic compounds to be proportioned is carried out in the known manner by means of a suitable organic solvent in specific operating conditions obtained by the addition of reagents.

This liquid-liquid extraction usually is carried out by means of laboratory equipment, e.g., extraction flasks agitated by mechanical means. These devices require large volumes of solvent and limited volumes of water samples. They further have the disadvantage that they work discontinuously and require constant supervision.

More complex, continuously operating devices have already been described that admit of a liquid-liquid extraction in a laboratory. This type of apparatus is classified into several categories. In some of them, the mixing takes place in containers under continuous agitation in order to increase the liquid-liquid interface.

Also, there is a laboratory apparatus in which the liquid-liquid contact is assured by the passage of the liquids in a helical coil made of teflon. The water that is to be analyzed and the solvent are mixed prior to entry into the coil. This coil is placed horizontally and the mixture is introduced according to a pulsed flow.

According to a third type of prior art apparatus, the water to be extracted and the extraction solvent are introduced into a column. Since this apparatus is provided for the use of solvents that are lighter than water, the latter is introduced at the top of the column, while the solvent is introduced at the bottom. The water, freed from the products that are soluble in the solvent, is collected at the bottom, the solvent charged with these products appearing at the top and being subjected to distillation prior to being recycled in the extraction process.

This type of prior art apparatus has several disadvantages to the extent that its use is limited to laboratories. In order for this apparatus to be suitable for use in places where the water to be analyzed is located, it must be able to withstand transportation, that is to say, it must include only leak-proof containers of robust construction and must not be of complex construction so as to reduce the risk of breakdown.

Since usually the product to be extracted has a weak concentration, a continuous operation is highly preferred in order to be able to treat considerable quantities of water.

Likewise, because of the weak concentrations of the products that are to be analyzed, it is desirable that they be extracted on site, if possible. In fact, the taking of samples, their transmission and storage provide many occasions for introducing into the samples other or the same contaminants, which distort the analysis.

Another drawback of the prior art equipment is the treatment of the solvent. As a rule, the solvent is recycled in the extraction process after it has been distilled at the boiling temperature. However, during distillation impurities can be carried along, which also leads to false results.

SUMMARY OF THE INVENTION

To overcome the various drawbacks that are inherent in prior art equipment, the object of the invention is to provide an apparatus which can easily be transported so that one can prepare, on the site where samples are taken of the water to be examined, a solution of reduced volume containing the products to be proportioned and drawn from this water by the liquid-liquid extraction process.

This object is achieved according to the invention by providing an apparatus for liquid-liquid extraction comprising a mixing compartment and a settling compartment, a device for recycling the extraction liquid, as well as storage tanks for the extraction liquid and for any spent reagents. The mixing compartment comprises a column disposed vertically and having an open lower end and equipped in its interior and practically throughout its length with a rotary element provided with surfaces that extend perpendicularly or obliquely to the axis of the rotary element, and including cooling means as well as means for introducing the liquids involved in the extraction process and any spent reagents. The settling compartment is formed by a closed leak-proof container provided with a device for checking the level of the extraction liquid and means for introducing the extraction liquid and for discharging the liquids. The open end of the mixing column extends into the lower part of the settlement container. The device for recycling the extraction liquid is fed from the settling compartment and produces such fluid in the form of a gas which is reintroduced in condensed form into the mixing compartment. A device is provided for obtaining compressed air whose operation is controlled by an electronic circuit, the compressed air being used for transmitting the reagents and the solvent from respective leak-proof storage tanks dependent upon the particular needs.

In order to obtain good results in a liquid-liquid extraction process, an intimate contact between the extraction liquid, hereinafter referred to as "solvent", and the liquid subjected to the extraction is of prime importance.

In the field of application envisaged in the present application, the liquid to be extracted or subjected to extraction will be water, but it is obvious that the present invention is also applicable to other combinatins of immiscible liquids.

It has been found that an advantageous arrangement for obtaining an efficient contact between the solvent and the water is formed by a column having on the inside throughout its length a rotary element provided with a surface or a plurality of surfaces that extend perpendicularly or obliquely to the axis of the rotary element. Thus, a co-current flow is achievedunder gravitational force in association with a mechanical action.

According to an embodiment of the invention, the rotary element consists of a rod or shaft which is provided throughout its length with a strip having a helical shape and rotating in one direction or the other. According to another embodiment, this element consists of a rod or shaft carrying a plurality of pallets or plates. In both cases, the rotational speed is between 100 and 1,000 rpm.

The upper part of the column is formed by a condenser in which a refrigerating liquid is caused to circulate. The solvent is introduced into the column in the form of a gas, and it is possible that in certain cases a non-condensed portion of the solvent in contact with the water to be extracted rises until it reaches the condenser.

Tests have shown that an optimum effect of the column is obtained, in the event it is equipped with a helical strip, if that portion of this strip located at the level of the condenser has a descending helix, while the remaining portion of the strip therebelow can have either an ascending or a descending helix.

BRIEF DESCRIPTION OF THE DRAWINGS

Other objects, features and advantages of the invention will be apparent from the following detailed description, taken with the accompanying drawings, wherein.

DETAILED DESCRIPTION OF THE INVENTION

Figure 1:
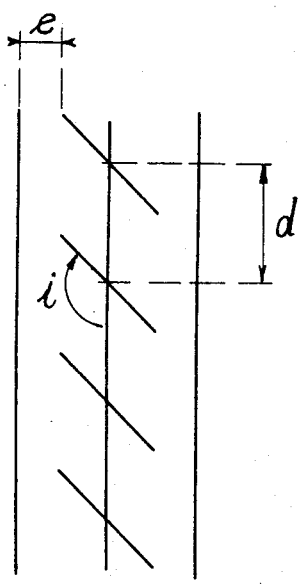
FIG. 1 is a schematic view of a portion of a column having in the interior thereof a rotary helical strip.

FIG. 1 shows a part of an extraction or mixing column equipped on the inside with a rotary mixer including a vertical shaft having fixed thereto a helical strip. In practice, the length of the column, made of a material which is inert to the materials contained therein, e.g. glass, can vary between approximately 100 and 700 mm for diameters of the helical strip varying between about 3 and 10 mm. The other parameters indicated in FIG. 1 preferably range between the following limits: d between about 2 and 10 mm; i between about 90 and 170 degrees; and e between about 1 and 8 mm. As indicated above, the rotational speed preferably ranges between 100 and 1,000 rpm.

Figure 2:
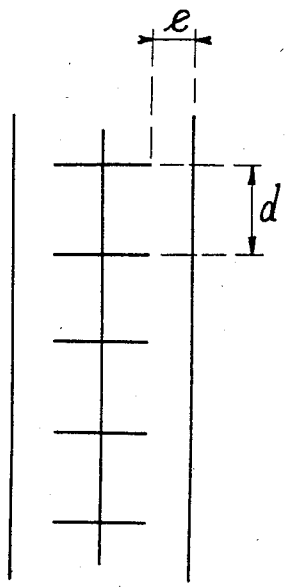
FIG. 2 is a view similar to FIG. 1, but wherein the column has therein a rotary vertical shaft having transverse plates.

FIG. 2 shows a part of the column equipped on the inside with a shaft provided with pallets or plates. In this embodiment, e ranges between about 1 and 8 mm, and d between 2 and 10 mm. The length of the column, the diameter of the shaft with the pallets, and the rotational speed have the values indicated above for the embodiment of FIG. 1.

The inlets for the liquids, i.e. for the water, for the solvent and for the reagents, are located at the top of the column, below the condenser. The bottom part of the column, whereat mixing takes place, extends into the lower part of a settling compartment, below the level of the solvent therein. The settling compartment, in the form of a container, has a solvent inlet connected to a solvent storage container, an overflow pipe for the lighter liquid (in the field of application provided the lighter liquid will be water), an outlet for the heavier liquid (the solvent), and a device for checking and regulating the level of the solvent. Such checking and regulating device is known in the art and operates, for example, with a pair of electrodes between which the resistance is measured. Depending on the data supplied by this device, the latter causes, by means of an electronic circuit, a mechanism provided for the feeding of solvent from the solvent storage tank to operate. This compensates for losses of the solvent during the process.

The outlet for the solvent is provided in the lower part of the container serving as the settling compartment and has two branches. One branch is used for taking samples of the solvent for analytical purposes, while the other branch leads the solvent, in conformity with the principle of communicating vessels, into a device where the solvent is evaporated in such a way as to retain the extraction products in the liquid phase and to recycle the pure solvent back to the liquid-liquid extraction process. This result is obtained by using an evaporation device at the surface at a temperature low enough for the extraction products to remain in the solvent. In a manner known from the prior art, such device is produced by installing glow plugs mounted above the surface of the liquid and regulated with the aid of a thermocouple associated with the glow plugs.

The introduction of any reagents that may be necessary for a satisfactory implementation of the liquid-liquid extraction process and the introduction of a complementary component of the solvent, dependent upon a lowering of the solvent level in the settling compartment, as determined by the electrodes of the regulating system described above, are effected by means of hermetically sealed tanks with the aid of compressed air. This compressed air is supplied by an air pump and distributed by an automatic multiple valve controlled by a suitable electronic circuit.

The water to be treated in the apparatus is introduced near the inlets for the reagents and for the solvent at the top of the column below the condenser by means of a regulated feed mechanism known from the prior art.

It will be understood, of course, that this apparatus can be provided in the form of a compact easily portable unit which can continuously treat samples of water that can amount to hundreds of liters.

Figure 3:
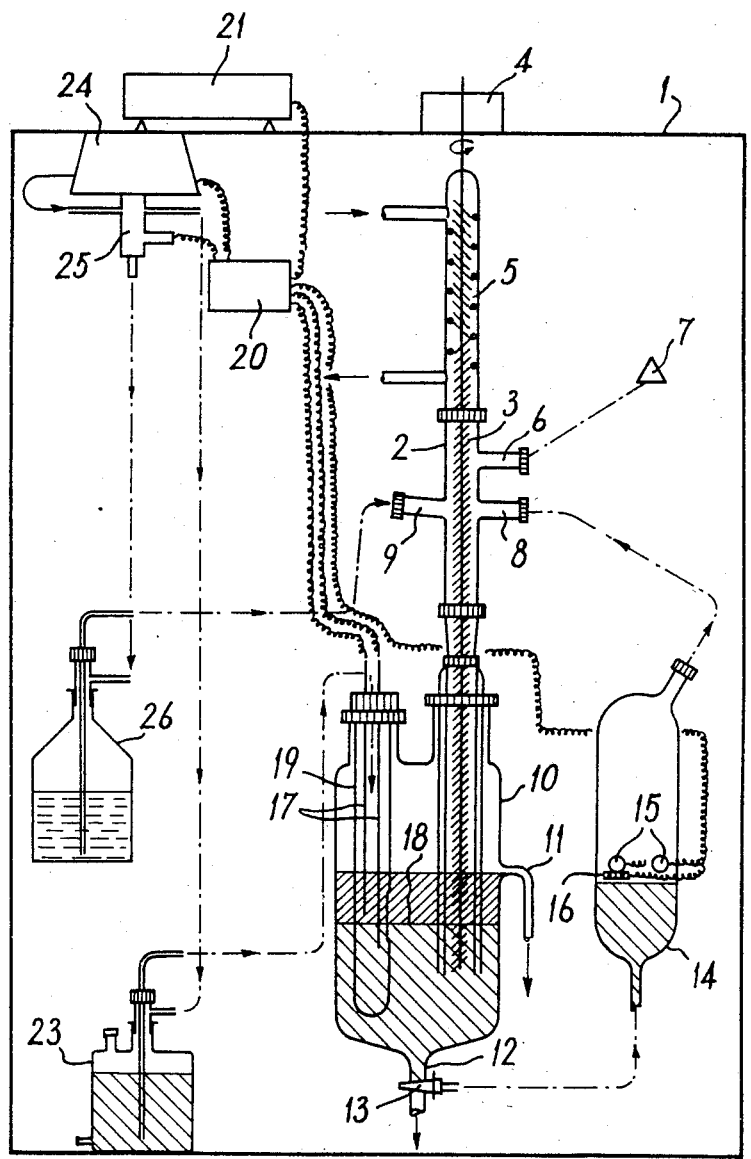
FIG. 3 is a schematic view of an apparatus according to the invention.

The above features of the apparatus of the invention will be described in more detail with reference to FIG. 3 which schematically shows an apparatus according to the invention in the form of a portable unit.

The apparatus shown is located within an enclosure 1 which is provided to protect the apparatus during transportation. The liquid-liquid extraction process takes place in column 2 which, in the illustrated embodiment, is equipped with a helical rotating strip 3 which is rotated by a motor 4. The upper portion of column 2 carries a condenser 5 having coils and in which recycled solvent, possibly still in the form of a gas at this level of the column, is condensed. Column 2 is fed continuously via inlet connection 6 with the water to be analyzed, the flow of which may or may not be regulated by a flow-and-pressure control system 7. Column 2 is fed with the recycled solvent via connection 8 and with reagents via connection 9.

The liquids introduced through connections 6, 8 and 9 are mixed and, under gravitational force, they descend into a lower portion of settling cell 10 having a connection 11 for gravitational discharge by overflow of the lighter liquid, i.e. the water being treated, a connection 12 for drawing off the heavier liquid, i.e. the solvent containing the extraction products and intended for the analytical laboratory, as well as a glass tube 19 containing two electrodes 17 for determining the relative location of the solvent/water interface 18. The glass tube 19 has an opening to enable the liquids to enter without disturbing the interface 18 and protects the electrodes from the emulsions and suspended materials. Electrodes 17 are connected to an intermediate electric connector box or circuit 20 and to a general electronic control box or circuit 21. A three-way valve 13 connects connection 12 to a cell 14 for storing and regenerating the recycled solvent. Glow plugs 15 associated with a thermocouple 16 ensure, by evaporation at the solvent surface, the regeneration of the solvent, the thermocouple ensuring a constant current by means of electronic circuits 20 and 21. As indicated above, the regenerated pure solvent is introduced continuously through connection 8 into column 2.

Contact electrodes 17 control by means of electronic circuits 20 and 21 the influx of pure solvent needed to maintain constant the level of solvent/water interface 18, thus compensating for solvent losses due to partial solubilization of the solvent in the water. The signal generated by electrodes 17 gives rise to the admission of compressed air produced by pump 24 and distributed by solenoid valve 25 into tanks 23 and 26 containing, respectively, make-up solvent and the reagents. This makes possible the metering of the introduction of these liquids into the extraction process dependent upon the particular requirements.

Figure 4:
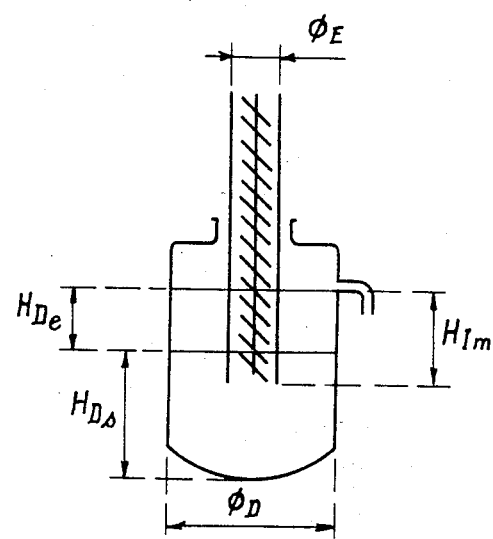
FIG. 4 is a schematic view illustrating dimensional parameters of the column and a settling cell according to the invention.

FIG. 4 is a schematic representation of the extraction column 2 and of the settling cell 10, with indication of some dimensional parameters. The values of these parameters in relation to the apparatus described above will be given below followed, in parentheses, by the ranges of the advantageous values such as have been established by the inventors for this type of equipment:

$\phi_D = 85$ cm (between 60 and 200 cm)

$\phi_E = 14$ cm (between 5 and 50 cm)

$\dfrac{\phi_E}{\phi_D} = 0.16$ (between 0.08 and 0.20)

$H_{Ds} = 17$ cm (between 10 and 20 cm)

$H_{De} = 3.4$ cm (between 1.0 and 8.5 cm)

$H_{Im} = 9.0$ cm (between 5 and 15 cm)

$\dfrac{H_{Ds}}{H_{De}} = 5$ (between 2 and 10) $\dfrac{H_{Im}}{H_{Ds}} = 0.53$ (between 0.5 and 0.75)

By the way of example, a number of ranges will be given below indicating the extraction time ($t_E$) and the settling time ($t_D$) for water and for the solvent, as well as the storage time ($t_s$) for the solvent obtained with the apparatus described above:

Water:
$t_E$ between 5 and 200 seconds
$t_D$ between 5 and 100 mn
Solvent:
$t_E$ between 5 and 200 seconds
$t_D$ between 60 mn and 50 h
$t_s$ between 42 mn and 35 h The ratio of water supply to solvent supply is calculated by means of the following data: the solvent flow ranges between 10 to 500 ml/h and the water flow ranges between 100 and 5,000 ml/h, thus yielding a ratio r of between 0.002 and 5.

Depending on the nature of the extraction solvent used, the temperature of the water ranges between 0° and 40° C. and that of the solvent between 10° and 80° C. Likewise, the temperature of the surface of evaporation depends on the solvent employed and usually ranges between 60° and 160° C.

To bring out the advantages of the apparatus of the invention, two extractions have been carried out, one with an apparatus incorporating the invention, the other with a flask. The water subjected to the extraction operation contained 100 ng/l for each of the products listed in the table below. The results of extraction with the flask have been chosen as a reference and arbitrarily have been assigned the value 100%. The percentages obtained with the apparatus of the invention are indicated with respect to the value relative to the flask. The volume of water (pH=2) subjected to the test was 5 liters, and the solvent was dichloromethane.

| Pesticides | Percentage found |
|---|---|
| Lindane | 105 |
| Atrazine | 100 |
| Heptaclor | 95 |
| Parathion | 110 |
| 2, 4 DDE⊕ | 100 |
| 2, 4 DDD⊕⊕ | 105 |
| 2, 4 DDT⊕⊕⊕ | 75 |

⊕⊕dichloro-diphenyl-dichloroethane
⊕dichloro-diphenyl-dichloroethylene
⊕⊕⊕dichloro-diphenyl-trichloroethane The ratio r equals 0.01 for extraction with the apparatus of the invention and 0.20 for extraction with the flask. This means that for comparable yields, 20 times less solvent is used in the apparatus incorporating the invention.

Although the present invention has been described and illustrated with respect to the preferred features, it will be apparent to those skilled in the art that various changes and modifications may be made without departing from the scope of the invention.

We claim:

1. An apparatus for carrying out a liquid-liquid extraction process by co-current contact between a first extraction liquid and a second liquid from which impurities are to be extracted by said first liquid, said first liquid being heavier than said second liquid, said apparatus comprising:

a mixing compartment in the form of a vertical column having an open lower end;

means for continuously introducing first and second liquids into said column such that said liquids pass co-currently downwardly through said column and are discharged from said open lower end thereof;

means for mixing said first and second liquids within said column to increase the contact therebetween so that impurities in said second liquid are extracted by said first liquid, said mixing means comprising a rotary element positioned within said column and extending throughout substantially the entire vertical length thereof, said rotary element having mixing surfaces extending perpendicularly or obliquely to the axis of said rotary element, and means for rotating said rotary element within said column;

a settling compartment in the form of a closed leak-proof container for receiving said liquids from said column and for allowing said liquids to separate by settling, with said heavier first liquid and extracted impurities settling to the bottom of said container and said second liquid collecting above said first liquid, said column extending into said container with said open lower end of said column being adjacent said bottom of said container;

first discharging means for discharging said collected second liquid from said container;

second discharging means for discharging said settled first liquid and extracted impurities from said bottom of said container;

means for receiving said first liquid and extracted impurities from said second discharging means, for separating said first liquid from said impurities, and for recirculating said first liquid back to said column, said means for continuously introducing said first liquid into said column, comprising said means for recirculating said first liquid;

means for removing samples of said first liquid and extracted impurities from said second discharging means for analysis;

a first storage tank containing make-up first liquid and connected to said container;

means for detecting the level of said first liquid in said container, said level decreasing as a function of losses of said first liquid during said process, and for generating a signal representative of a predetermined loss of said first liquid;

a second storage tank containing reagents employable to facilitate said extraction process and connected to said column;

a source of compressed air connected to said first and second storage tanks; and electronic control means, connected to said compressed air source and to said detecting means, for operating said source to supply compressed air to said first storage tank to discharge therefrom make-up first liquid to said container in response to said signal from said detecting means, and for operating said source to supply compressed air to said second storage tank to discharge therefrom reagents to said column.

2. An apparatus as claimed in claim 1, wherein said level detecting means comprises a glass tube extending into said container, a pair of electrodes in said glass tube, and an opening in said glass tube enabling said liquids to contact said electrodes.

3. An apparatus as claimed in claim 1, wherein said rotary element includes substantially horizontal plates defining said mixing surfaces.

4. An apparatus as claimed in claim 1, wherein said means for introducing said first and second liquids involved in the extraction process and said reagents into said column comprise connections spaced a short distance from the upper part of said column and below said cooling means.

5. An apparatus as claimed in claim 1, further comprising means for regulating the flow and the pressure of said second liquid which is to be subjected to extraction and supplied to said column.

6. An apparatus as claimed in claim 1, wherein said separating means comprises a leak-proof cell, means in said cell for evaporating said first liquid to form a vapor and means for recirculating said vapor to said column, and further comprising cooling means in an upper portion of said column for condensing said vapor into said first liquid.

7. An apparatus as claimed in claim 6, wherein said evaporating means comprises glow plugs for evaporating said first liquid at the surface thereof, and a thermocouple for controlling said evaporation.

8. An apparatus as claimed in claim 1, wherein said rotary element includes a strip with a helical shape defining oblique said mixing surfaces.

9. An apparatus as claimed in claim 8, wherein said strip has a descending helix in the upper part of said column including said cooling means, and an ascending or descending helix in the remaining part of said column.

* * * * *

UNITED STATES PATENT AND TRADEMARK OFFICE
CERTIFICATE OF CORRECTION

PATENT NO. : 4,567,020
DATED : January 28, 1986
INVENTOR(S) : Louis COGNET et al.

It is certified that error appears in the above-identified patent and that said Letters Patent is hereby corrected as shown below:

On the Cover Page, Section [73], change the Assignee name to:
--SOCIETE LYONNAISE DES EAUX ET DE L'ECLAIRAGE--.

Signed and Sealed this

Eighth Day of July 1986

[SEAL]

Attest:

DONALD J. QUIGG

Attesting Officer

Commissioner of Patents and Trademarks